2 Sheets—Sheet 1.
J. S. MARSH.
Grain-Binder.
No. 210,949.  Patented Dec. 17, 1878.
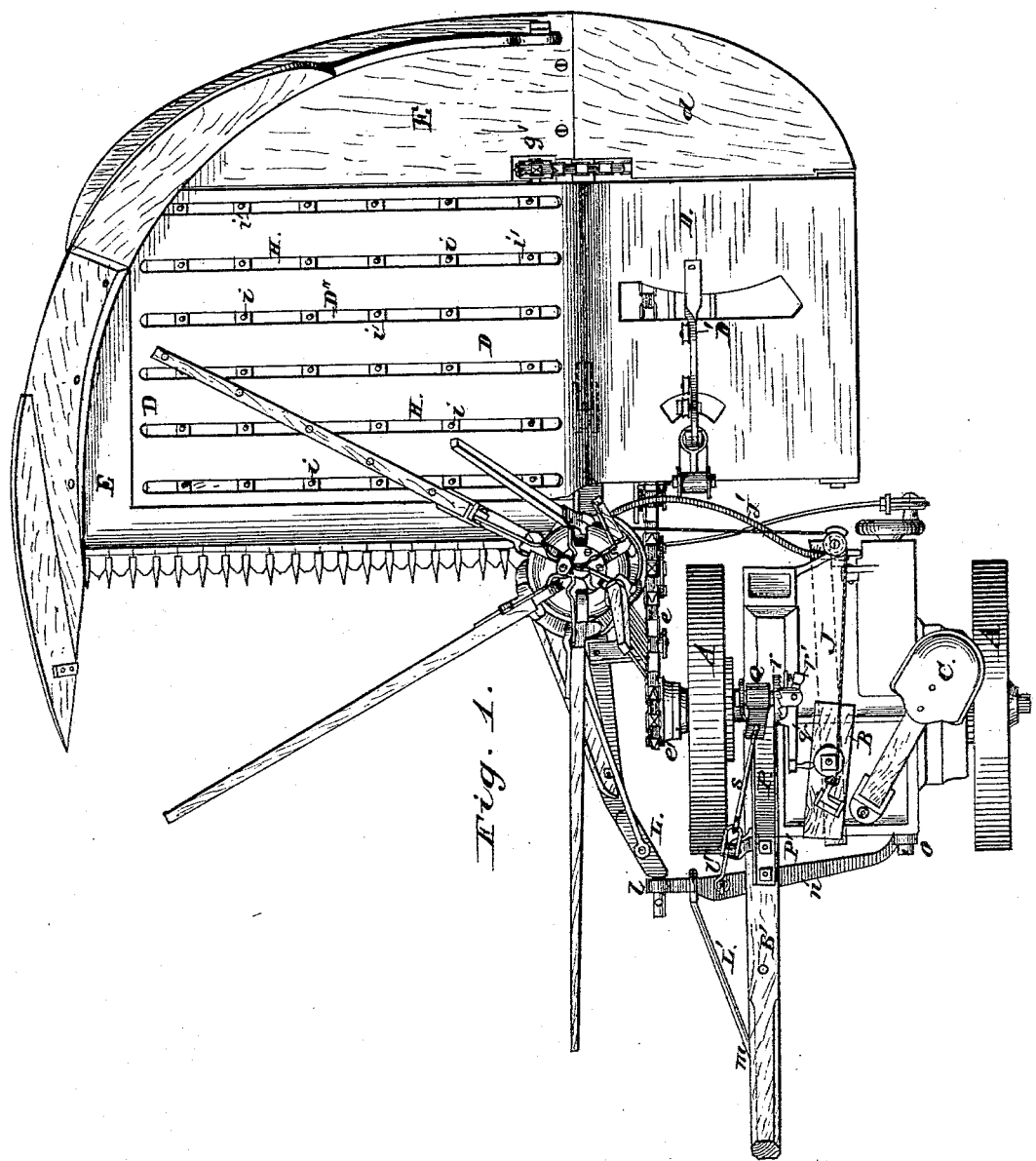
James S. Marsh,
Inventor.
Attest:
H. D. Perrine
J. A. Rutherford
By J. J. Coombs,
Attorney.

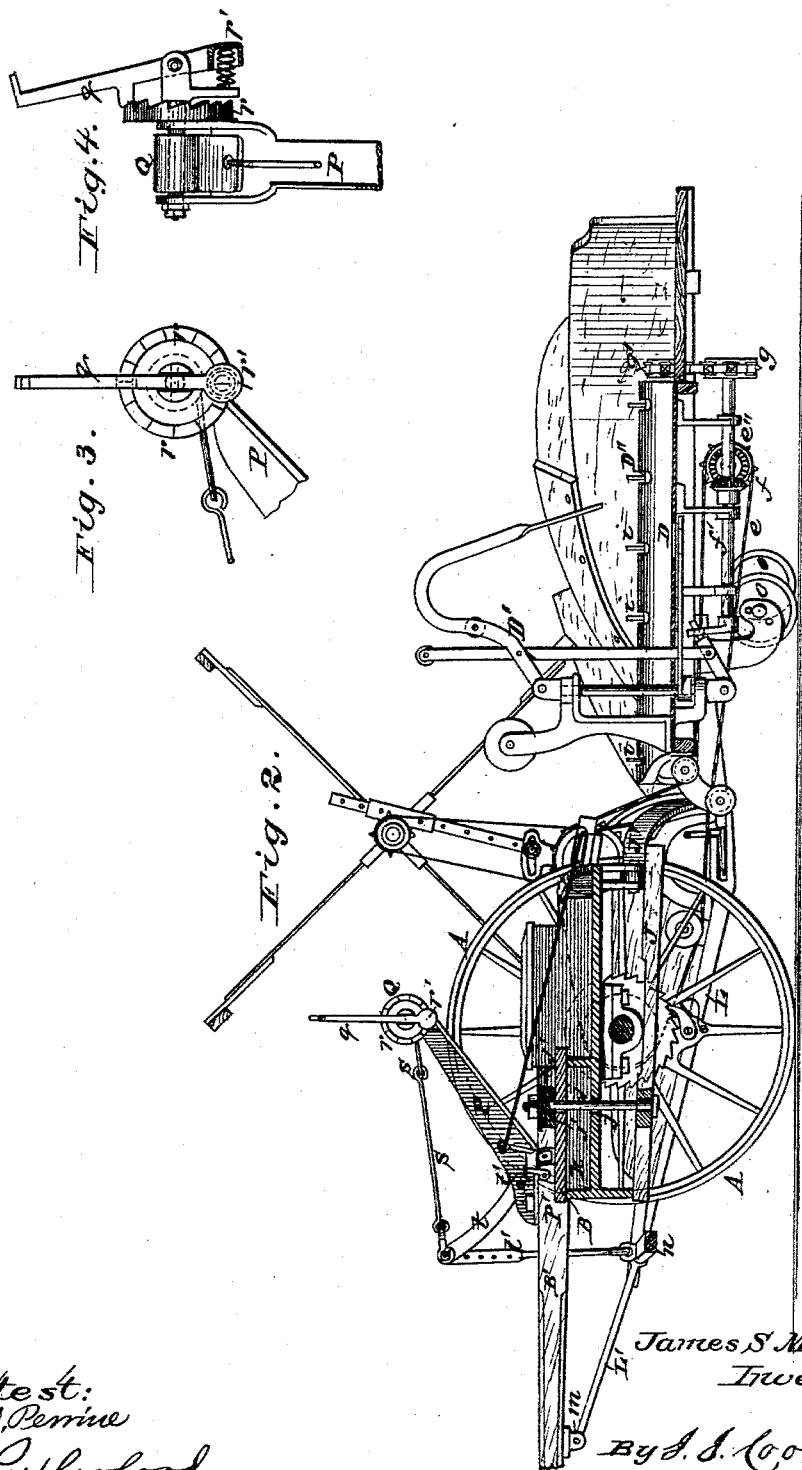

UNITED STATES PATENT OFFICE.

JAMES S. MARSH, OF LEWISBURG, PENNSYLVANIA.

IMPROVEMENT IN GRAIN-BINDERS.

Specification forming part of Letters Patent No. 210,949, dated December 17, 1878; application filed May 11, 1877.

*To all whom it may concern:*

Be it known that I, JAMES S. MARSH, of Lewisburg, in the county of Union and State of Pennsylvania, have invented certain new and useful Improvements in Harvesting-Machines, of which the following is a specification:

My invention relates, first, to a mode of attaching and detaching an automatic binder to and from a rear side-cut harvesting-machine; secondly, to a means of transferring a portion of the weight of a self rake or reel, supported upon the platform, from the platform to the main frame of the machine, so as to prevent the weight of the rake or reel from bearing too heavily upon the caster-wheel on that side of the platform which is next to the main frame; and, thirdly, to an improved mechanism for raising the front end of the drag-bar to tilt the cutters.

The accompanying drawings show my improvements applied to a convertible reaper and mower of the kind shown and described in Letters Patent granted to me February 28, 1871, No. 112,263, and which I have been manufacturing under the name of the "Valley Chief."

Figure 1 is a plan view of the machine with my improvements attached. Fig. 2 is a longitudinal vertical section of the same machine, except that it has an ordinary revolving reel instead of the combined rake and reel shown in my aforesaid Letters Patent and in Fig. 1 of the annexed drawings. Figs. 3 and 4 are detached views of my improved mechanism for raising the front end of the drag-bar to tilt the cutters.

A A are the main driving-wheels. B is the main frame or bed of the machine, of cast-iron, and cast all in one piece. B' is the tongue, rigidly attached to the main frame, and C is the driver's seat. D is an attachable and detachable supplemental platform, carrying an automatic binder, an endless apron for conveying the cut grain to the binding mechanism, and gearing for operating said binder and endless apron by power derived from the main driving-axle, all of which are removable with said supplemental platform.

As I do not claim to have invented any new binding mechanism, I have represented in the drawings a well-known binder, but do not limit myself to the use of it, as any other known binder may be used instead of it.

The binder D' and the endless apron D'' are attached to the supplemental platform D, and are removable with it. Said supplemental platform is fitted into an opening or recess in the main platform E when the binder is to be used, and an extension-board, $d$, is screwed to the main platform.

When the machine is to be used without the binder the recess or opening in the floor of the main platform is filled by a plane board, which fits therein, and the extension-board $d$ is removed. The binder D' is operated by means of an endless chain, $e$, passing around the sprocket-wheel $e'$, on the inner end of the driving-axle, and around another sprocket-wheel, $e''$, under the binder-platform, and, by means of the bevel-gear $f$, the shaft $f'$, which operates the binding mechanism, is rotated. On the rear end of said shaft $f'$ is mounted a sprocket-wheel, $g$, and a chain passing around the same and around another sprocket-wheel, $g'$, on the rear end of one of the rollers which carry the endless apron, gives motion to said apron. That portion of the supplemental platform which covers the endless apron has a series of slots, H, in it, through which a series of pins, $i$, projecting from the endless apron, protrude to remove the cut grain to the binder. These pins project from cross-slats $i'$, which are attached to the endless apron. This binding mechanism may be used in connection with the combined rake and reel shown in Fig. 1; but when so used the rakes should be made to rise and turn their teeth away from the platform, about the time of passing the cutters, by means which are well known, and improved mechanism for effecting which is shown and described in another application for Letters Patent filed by me herewith; or said binding mechanism may be used in connection with an ordinary revolving reel, such as is shown in Fig. 2. The main platform rides on two caster-wheels, $o\ o$, opposite to each other, a short distance in rear of the cutter-bar, and rocks upon said caster-wheels to tilt the cutters.

Previous to the improvement which constitutes the second part of my invention great inconvenience was experienced by reason of the weight of my combined rake and reel pressing the caster-wheel next to the main frame into the ground. My improvement, which I will now proceed to describe, is intended to obviate this difficulty.

J is a bar lying under the main frame or bed, and held up against a plate projecting downward from the front end thereof by means of a stirrup, from which a screw-bolt, $j$, passes up through the floor of said frame and through a supporting spring-board, $k$. On the upper end of said bolt $j$ is a screw-nut and metal washer, and between said metal washer and the spring-board is rubber-washer $j'$, of considerable thickness. The rear end of said bar J passes under and supports an iron bar, J', one end of which is pivoted to the rear end of the main frame, near its outer rear corner, and the other end is pivoted to the corner of the platform which supports the rake or reel. The said bar J, when screwed up hard against the bar J', tends to raise said front corner of the platform, and thus to transfer a portion of the weight thereof to the main frame, and thereby to relieve the supporting caster-wheel from a portion of the excessive weight incident to the carrying of the rake or reel. By means of the screw-nut on the bolt $j$ the bar J may be adjusted to bear more or less of the weight of the platform, as may be desired.

The third part of my invention consists, essentially, in substituting for the vibrating lever for raising, lowering, and tilting the cutters, as shown in my said Patent No. 112,263, a windlass, strap, and auxiliary devices for the same purpose, as herein shown and described.

L is the drag-bar, rigidly attached to the finger-bar; L', a bar or rod linked or pivoted to the tongue at $m$; $n$, a bar or rod pivoted to the main frame at $o$, passing through an eye at the end of L', and connected with L by a swivel-joint at $l$; and $l'$ is a lifting-rod, linked to $n$ near its inner end. P is a strong brace or inclined standard, firmly attached to the tongue at P', or it may be attached to the frame, and rising to a point within convenient reach of the driver. On the upper end of this standard is mounted a windlass, Q, provided with a crank, $q$.

S is a strap of leather or other suitable flexible material, or it may be a chain, one end of which is attached to the drum of the windlass and the other to the upper end of a metal rod, $s$, the lower end of which is linked to the lifting-rod $l'$, and also to the upper end of the bar $t$, the lower end of which bar is pivoted at $t'$ to the foot of the standard P. The crank $q$ is pivoted to the end of the windlass-shaft, so as to be capable of a limited vibratory movement thereon, as shown in Fig. 4. The windlass-shaft has its crank end bearing in the center of a stationary ratchet-wheel, $r$, with which it is kept engaged and locked by means of a spring, $r'$, except when moved by the hand.

When the driver desires to raise the cutters he turns the crank in the direction to wind up the strap until the cutters have attained the desired position, at which point, by simply releasing the pressure of his hand, the spring $r'$ will force the crank into engagement with the ratchet-teeth, so as to securely lock it. When he desires to lower the cutters he draws the crank so as to release it from the ratchet, when the strap will unwind until the cutters are sufficiently depressed, and then, by releasing his hand-pressure upon the crank, the spring will throw it into engagement with the ratchet-teeth, and so arrest the farther depression of the cutters. The bar $t$ is so bent at its lower end, and so arranged upon the tongue, that when the cutters have descended as low as it is ever necessary to let them down said bar will rest upon the tongue, and thus prevent any farther descent.

Some of the advantages of my improvement over the vibratory lever heretofore used for raising, lowering, and tilting the cutters are as follows: When the machine is used for reaping, the variations in the height of the cutters which are required to be made from time to time are considerable; and hence, if a vibratory lever is used, in order to give it sufficient purchase to be operated with ease it must have a long sweep, and the driver, especially if a half-grown boy, will have to reach an inconvenient distance or exert an undue amount of strength to operate it; but with my improvement the crank may be so placed and the drum of the windlass may be of such size that quite a small boy can operate it without undue reaching or excessively exerting his strength.

When the machine is to be used as a mower, the platform is removed, as described in my said former patent. When it is to be used as a self-raking harvester, without a binder, the supplemental platform and the extension-board $d$ are removed, and the opening in the main platform is filled by a plane movable table, making a plane smooth floor to the platform; but when it is to be used as a reaper and binder, the main platform and the supplemental platform are combined, as shown in the drawings.

It will be seen that by means of these improvements I produce a machine that is readily convertible into a mower, self-raking reaper, or a combined reaper and binder, as may be desired.

What I claim as my invention, and desire to secure by Letters Patent, is—

1. In combination with the main platform of a rear side-cut two-wheeled harvesting-machine, a detachable supplemental platform or table, in rear of the main frame, carrying an automatic binder, an endless apron for carrying the cut grain to the binder, and gearing, substantially such as described, for operating said binder and endless apron by power derived from the main driving-axle, all constructed, combined, and arranged to operate substantially as set forth.

2. In a rear side-cut two-wheeled harvesting-machine, the combination of a main platform supporting a combined rake and reel, or a reel only, a detachable supplemental platform, in rear of the main frame, carrying an automatic binder, an endless apron for conveying the cut grain to the binder, and gearing, substantially such as described, for operating said binder and endless apron by power derived from the rotation of the main driving-axle, all constructed, combined, and arranged to operate substantially as set forth.

3. In combination with the main frame and main platform, mounted on two caster-wheels, opposite to each other, a short distance in the rear of the cutter-bar of a rear side-cut harvesting-machine, the adjustable supporting-bar J, and the cross-bar J', pivoted to the main frame and to the platform, by means of which a portion of the weight of the platform is transferred to the main frame, substantially as described.

4. The combination of the standard P, the windlass Q, the strap S, rod $s$, and bars $t$, $l'$, L, and L', for raising, depressing, and tilting the cutters, all constructed, combined, and arranged to operate substantially as described.

In testimony that I claim the foregoing I have hereunto set my hand in the presence of the subscribing witnesses.

JAMES S. MARSH.

Witnesses:
E. C. WEAVER,
GEO. R. COUPLAND.